Sept. 3, 1968   K. L. AGNEW   3,399,993
PHOTOGRAPHIC REPRODUCTION IN THREE DIMENSIONS
Filed Jan. 8, 1965   4 Sheets-Sheet 1

United States Patent Office 3,399,993
Patented Sept. 3, 1968

3,399,993
PHOTOGRAPHIC REPRODUCTION IN
THREE DIMENSIONS
Kenneth Leslie Agnew, Falconbridge, Ontario, Canada
Continuation-in-part of application Ser. No. 108,010,
May 5, 1961. This application Jan. 8, 1965, Ser.
No. 424,433
4 Claims. (Cl. 96—27)

ABSTRACT OF THE DISCLOSURE

Method for reproducing three dimensional images in a transparent differentially photosensitive material comprising outlining the object to be reproduced with a plurality of separate vertical light rays and primary lines, recording the images of each primary line as secondary lines at more than one different angle, reprojecting simultaneously one set of secondary lines at a time into the photosensitive material from the same relative angles as the originally projected primary lines were recorded. The foregoing steps are repeated until all of the recorded primary lines are reprojected into the photosensitive material.

---

This is a continuation-in-part of application Ser. No. 108,010 for Photographic Reproduction in Three Dimensions, filed May 5, 1961, now abandoned, and relates to a method of recording the shape of three-dimensional objects and reproducing them photographically, in three dimensions, inside the space occupied by a transparent differentially-photosensitive material.

Lines are projected onto the object whose shape is to be recorded, and the resulting contour lines are recorded in two or more views at different angular relationship to each other. The resulting views of each contour line are reprojected, one multiple-viewed contour line at a time, and with the same angular relationship, into the space occupied by a transparent differentially-photosensitive material, so that the line of intersection of the projected views recreates the contour line within the space occupied by this material. The intensification of illumination at the line of intersection of the sheets of reprojected energy, in a transparent differentially-photosensitive material, will then provide a record, within the space occupied by the material, of each contour line, similar to the shape of the contour line produced by the original sheet of light as it impinged on the original shape. The sum of the contour lines reproduced outlines the three-dimensional image.

The present invention will be more fully understood from the following description:

Figure 1:
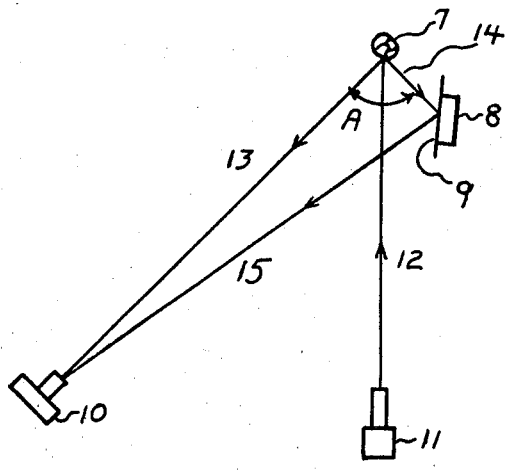
FIGURE 1 is a diagrammatic plan of an arrangement used to obtain a record of the contour lines.

Referring first to FIGURE 1, 11 is a projector throwing an image of a line (which is a primary line) along a path 12 onto the shape to be reproduced 7, in this case a tilted football. The image of the line on the football is recorded by path 13 direct to the camera 10, and also by path 14, at Angle A to path 13, to the mirror 9, supported by stand 8, and thence by path 15 to the camera 10 (these recorded lines being secondary lines). Instead of the mirror, of course, another camera may be set up on an extension of path 14, to record directly. Also, more than two cameras or one mirror may be used, with the path of each recording image at an angle to all the others, to give more than two views, and thus intensify the contrast at the line of intersection when reprojected as described below; in some cases only one record, or camera is required, as is also mentioned below.

Figure 2:
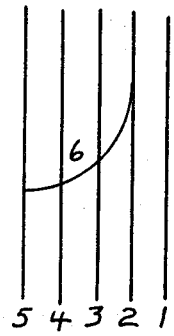
FIGURE 2 is a view of six lines which were projected onto the shape to be reproduced.
Figures 3, 4:
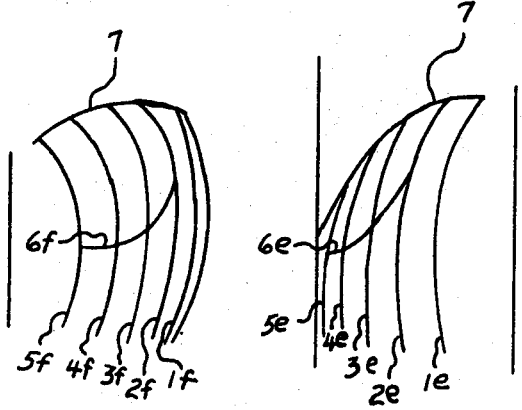
FIGURE 3 is a composite record of the six resulting contour lines, together with a partial outline of the shape to be reproduced, as viewed directly by the camera.
FIGURE 4 is a composite record of the six resulting contour lines, together with a partial outline of the shape to be reproduced, as viewed in a mirror at a different angle to that in FIGURE 3, reversed to compensate for the reversal of the mirror image, and enlarged to the same scale as FIGURE 3.

1, 2, 3, 4, 5 and 6, FIGURE 2, are lines which may be projected and viewed successively, or simultaneously if a tracing device with coupled reprojector is used, shown as a composite, and FIGURES 3 and 4 are, respectively, composites of the direct view and the view via the mirror of the projected and recorded lines 1, 2, 3, 4, 5 and 6, on the football. FIGURE 4 is shown reversed to correct for the mirror reversal, and is so reprojected. In this illustration, the few lines are shown widely spaced, but in practical application many would normally closely adjoin or overlap each other.

Figure 5:
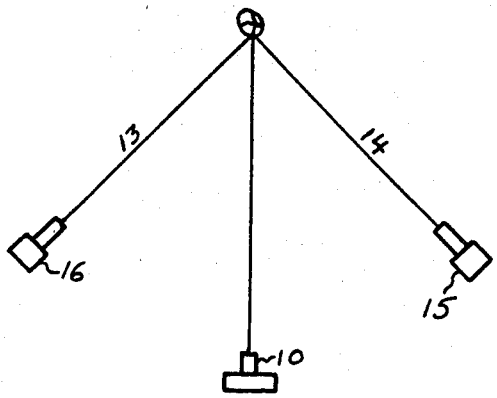
FIGURE 5 is a diagrammatic plan of an arrangement used to reproject the images of the contour lines onto the original shape, for illustrative purposes.
Figure 6:
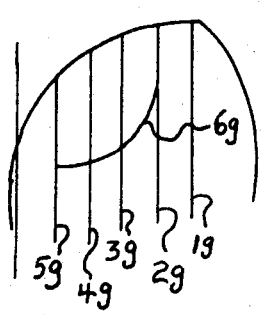
FIGURE 6 is a composite record of the reprojected views shown in FIGURES 3 and 4, when properly intersecting on the shape, together with a partial outline of the shape.
Figure 7:
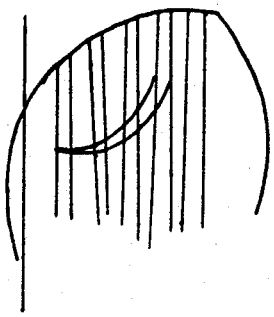
FIGURE 7 is a composite record, similar to that in FIGURE 6, but with the shape slightly out of the position where the reprojected sheets of energy intersect.

FIGURES 5, 6 and 7 demonstrate the reprojection of the contour lines, shown in FIGURES 3 and 4. In this case, for example, contour line 1f from FIGURE 3 was projected by projector 16, FIGURE 5, along the same path 13, and onto the same football 7, as was shown in FIGURE 1. Simultaneously contour line 1E, FIGURE 4 was projected by projector 15, FIGURE 5, along the same path 14, and onto the same football 7, as are shown in FIGURE 1. When properly intersecting they coincide as one line 1g, FIGURE 6, similar to that originally recorded as in FIGURE 1. FIGURE 6 is a composite reproduction made in similar fashion from the successive reprojections of the pairs of lines shown in FIGURES 3 and 4, to produce 1g, 2g, 3g, 4g, 5g, and 6g where they intersect as shown in FIGURE 6.

It is obvious, from the above, that one of each set of reprojected contour lines may be the originally projected line, used without preliminary two-dimensional replication, as, if projected into the transparent differentially-photosensitive material at the same angle as the original line was projected for primary record, the sheet of projection would have the same cross-sectional shape as if it was photographed by a camera superimposed on projector 11, FIGURE 1, and then the photographed line reprojected by a projector at the same position as the camera 10, FIGURE 5, assuming this camera has the same relative position to lines 13 and/or 14 as projector 11, FIGURE 1. Indeed, in the usual case of the original projections being straight lines, no difficulties regarding enlargement or reduction of size of these lines arises, to co-ordinate with the lines emitted by, say, projectors 15 and/or 16, FIGURE 5. This is clearly shown by reference to the reproduction of straight lines in FIGURE 6, by reprojection of lines 1f to 5f, FIGURE 3, and 1e to 5e, FIGURE 4, and which was viewed at the same angle as the original straight contour lines 1 to 5, FIGURE 2, were projected.

Projection of lines is described, but these lines may be considered to be shortened to the length of a dot, although this would often be an inefficient method. Similarly a series of dots or dashes can be considered a line, even though it is discontinuous. The size of lines may be varied in reproduction, providing similarity in shape and relative position to each other are maintained.

FIGURES 8 to 12 clarify my method further. Consider the transparent differentially-photosensitive material 17 as a plastic, which, at 10° C. above the ambient temperature, becomes opaque, and that all rays entering the plastic are of sufficient energy, and the absorption coefficient of the plastic is such that for the first inch of penetration, during the unit of time of exposure, the temperature in the path of each ray is raised about 5° C., and 4½° C. for the second inch, et cetera (actually $I = I_0 e^{-kt}$).

Figure 8:
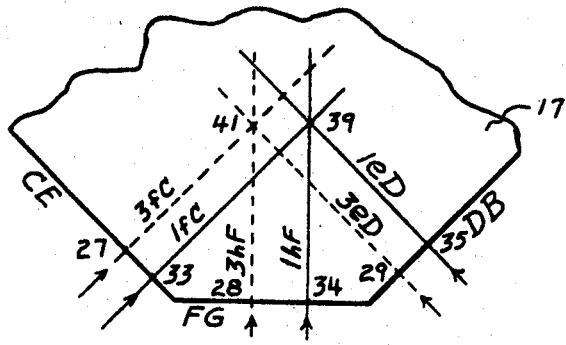
FIGURE 8 is a portion of a section of a transparent differentially-photosensitive material with rays of reprojected energy drawn to intersect at points on the reproduced contour line.
Figure 9:
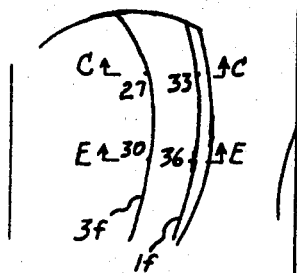
FIGURE 9 is a view of the shape to be reproduced, in outline, with two contour lines superimposed.
Figure 10:
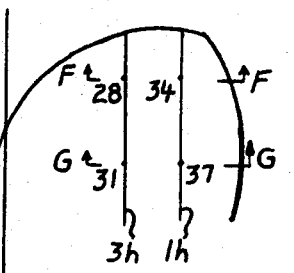
FIGURE 10 is another view of the shape to be reproduced, in outline, with two contour lines superimposed, taken from a different angle than the view shown in FIGURE 9.
Figure 11:
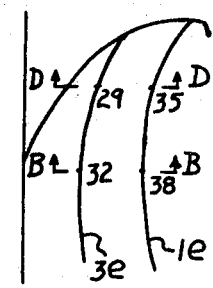
FIGURE 11 is a third view of the shape to be reproduced, in outline, with two contour lines superimposed, taken from a different angle than the views shown in FIGURES 9 and 10.
Figure 12:
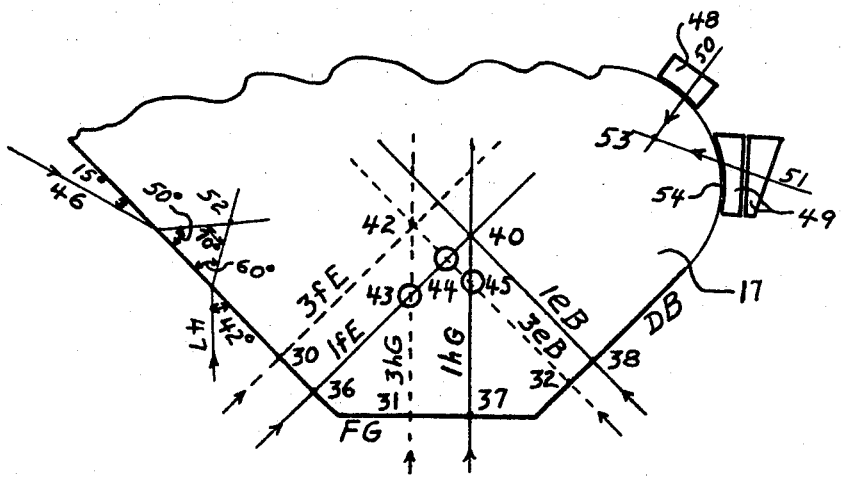
FIGURE 12 is a portion of a section of a transparent differentially-photosensitive material, at a different level than FIGURE 8, with rays of reprojected energy drawn to intersect at points on the reproduced uontour lines, and demonstrating why adjacent lines must be reprojected sequentially; auxiliary series of lines illustrate methods of adjustment of angle of entering rays of energy.

Consider that FIGURE 9 is a reflective surface, except for lines 1f and 3f, and is pasted to face CE as shown in FIGURES 8 and 12, so that section C—C appears at the level of FIGURE 8 and section E—E at the level of FIGURE 12; and similarly FIGURE 10 is pasted to face FG, and FIGURE 11 to face DB. Now if lines 3f, 3h, and 3e are blanked out, and the three faces are illuminated normally by parallel rays from the three directions shown (preferably with coherent light to decrease side effects due to diffraction on passage through the slits 1f, 1h, and 1e), the three rays 1fC, 1hF and 1eD will pass through the corresponding slits 1f, 1h and 1e at the corresponding points 33, 34 and 35, at the level of the section shown in FIGURE 8, each one heating the plastic by about 4½° as they near the point of intersection. However, at their point of intersection, 39, their effect is cumulative, causing an elevation of temperature of about 13½° at this point only, and therefore creates an opaque spot at 39 only, under the given conditions.

Similarly at the section shown as FIGURE 12, parallel light passing normally through slits 1f, 1h and 1e at corresponding points 36, 37 and 38, will produce an opaque spot at the point of intersection 40, and so for all the lines where the rays from 1f, 1h and 1e intersect, within the transparent differentially-photosensitive material 17.

Now, if the first line of intersection is allowed to cool, slits 1f, 1h and 1e are blanked out, and slits 3f, 3h and 3e are uncovered, and rays, as above, projected through them simultaneously, a second opaque line, including points 41, FIGURE 8, by rays 3fC, 3hF and 3eD passing through the respective points 27, 28 and 29, and 42, FIGURE 12, by rays 3fE, 3hG and 3eB passing through the respective points 30, 31 and 32, will be produced within the transparent differentially-photosensitive material 17.

By originally projecting a sufficient number of lines, as partially indicated in FIGURES 1 and 2 of my application, and obtaining corresponding multi-angular views of each line, a curved surface may be built up within the transparent differentially-photosensitive material, by the adjacent lines of intersection. The reprojections may be of lines as a whole, or pencils of energy drawn along the lines to sweep out the sheets of energy.

In FIGURE 12 I have circled points 43, 44 and 45 to illustrate why adjacent lines, or areas, may not be projected simultaneously, as these points would not lie on the desired surface of reproduction, and would obscure it. Of course, it may be possible, in some cases, to reproject widely separated sets of lines simultaneously, if the separation is such that the intersecting sheets do not interfere as described above, and the degree of necessary separation depends on the magnitude of the angle between component sheets of projection of a set. In effect, this means that separated areas being reproduced may be formed by sequential build-up of each area, simultaneously in the different areas, if points of intersection from the different areas do not interfere with the desired surface.

In the illustration above, FIGURE 1, lines are shown projected on to the shape from one direction only, and viewed and then reprojected, FIGURES 5 and 7, from two directions. Obviously, for a complete solid shape, the original lines must be projected from more than one direction, spaced around the shape, and each image of a line on the object recorded by at least two views at a suitable angular relationship to each other (bearing in mind that one of the views may be the originally projected lines and need not be recorded in conjunction with the object), and these single-line views reprojected simultaneously into the transparent differentially-photosensitive material at the same angle as recorded, the multiplicity of successive resulting contour lines at intersection building up the three-dimensional image. To do this it will usually also be necessary to have cameras and projectors in planes at angles to each other (or mirrors at suitable angles); for instance, in FIGURES 1 and 5, additional cameras and projectors would be at some angle to the plane of the paper, or, alternatively, the object and the transparent differentially photosensitive material might be rotated. This would adjust for diminution of light where a surface traversed by a contour line was at an acute angle, over a portion of its length, to the line joining any projector and the object, and would provide coverage of top and bottom as well as side surfaces, and of surfaces undercut with respect to any particular camera or projector. The out-of-position projection of lines in FIGURE 7, where the lower portion of line 6 shown coincidence, illustrates that projected lines must be at an appreciable angle to the plane containing the projectors, cameras and object in any particular view.

In the description above, it is intimated that the lines must be projected, or used as masks with parallel beams of light, and therefore must probably be widely enough separated in the recording to permit their successive projection, through the recording medium, after adjustment on recording and re-adjustment on reprojection. This is not so, as narrow bands, for instance, may be originally projected simultaneously onto the object, and the resulting contour lines recorded on one record of each view. These adjacent lines may then be used as guidelines for a tracing device attached to a device outside the area of the recording, emitting a pencil of energy, such as a laser, and two or more pencils of energy drawn along, guided by two or more of the equivalent contour bands of a set recorded in two or more views. As pointed out, one of the views may be a virtual one, consisting of the originally projected lines, altered in size to that of the other recording, if necessary. Phrases such as "multiple secondary lines" and "more than one different angles," are intended to include the case described where only one view is recorded as secondary lines, and the other view is that of lines similar to those originally projected on the object whose shape is to be reproduced. The two or more pencils of energy will be drawn along the sheets of projection, so that they occupy the same section simultaneously; for instance, pencils of light 3fC, 3hF and 3eD would be projected at the section represented by FIGURE 7, simultaneously, with the coupled tracing device at point 27, FIGURE 9; point 28, FIGURE 10; and point 29, FIGURE 11. Similarly, when three tracing devices were at points 30, 31, and 32, of recordings shown as FIGURES 9, 10 and 11, the corresponding pencils of energy would be projected along paths 3*f*E, 3*h*G and 3*e*B at the section shown in FIGURE 12.

By this coupled tracing mechanism, and original projection of bands, a simple shape like a football could be recorded in four photographs, in tetrahedral arrangement, if only two rays at intersection were required to activate the transparent differentially-photosensitive material, as one of each pair could be the originally projected line. For more complex shapes, as in portraiture, a greater number of recordings might be required. It is clear that if the shape is very irregular, in addition to an increase in the number of directions from which lines are projected onto the original object, smaller angles between views are required, so that the reflected and reprojected rays may replicate grooves and pits on the surface.

By differentially-photosensitive solid is meant a material which is affected by radiation above a certain threshold of intensity, or in which a synergistic action produces a significant effect with two or more different types of radiation (some photosensitive glasses are fifty times as sensitive to nucleation by ultra-violet light as their temperature is raised, as, for instance, by infra-red radiation), but in which no significant effect results below this threshold, or in the absence of a synergistic effect from simultaneous exposure to different radiation. By transparent is meant a material capable of absorbing sufficient of the radiant energy producing the image to be activated above a certain threshold of intensity or synergism, and with a transparency to this radiant energy sufficient to ensure that at the point of simultaneous intersection of the rays the activating energy will be significantly greater than at any other point in the path of other radiation in the photosensitive solid. The invention is not to be considered to be restricted to recording and reprojecting visible light, but is intended to apply to any radiation which may be projected as a narrow beam to produce a significant photo effect, at the points or lines of simultaneous intersection only, within the space occupied by the transparent differentially-photosensitive material, which is, or may be made, visible.

By "simultaneous" is meant that time within which the desired cumulative or synergistic effect occurs; for instance, if increase of absorbed heat produces the effect, one radiator could operate slightly out of phase in time with the other, as long as the heat from one did not leak away before the heat added by another radiator produced the desired effect.

If radiant energy is projected through a lens it is preferable that a long-focus lens be used, so that there will be negligible divergence or convergence of the rays, and all parts of a pencil or sheet of radiated energy will be substantially parallel, thereby obviating effects due to undesired dispersion and refraction. In other words, no focusing of an individual ray should ideally be necessary, but merely adjustment so that the rays intersect at the original angle and at the same position with respect to other rays, as they did when originally impinging on the shape being reproduced photographically.

Two methods have been described, one in which individual lines are projected onto the object and one set of the resulting contour lines recorded for direct reprojection or as guides for tracers with coupled projectors; the other in which multiple closely spaced bands were projected on the object and the resulting sets of multiple contour lines used to guide tracers with coupled projectors. Where automatic tracers are used, the first method is readily applicable, but complex shapes causing discontinuities in the lines might create difficulties in the use of the second method. In this case it may be more economical to project a group of widely-separated lines onto the object, and record the resulting sets of contour lines; followed by projection of another group of widely-spaced lines on the object and covering areas in between the first group, and subsequent recording; with continuation of the process to cover the entire area to be reproduced.

Instead of being coupled directly to a projector, the information from the tracer may be fed to an intervening mechanism (such as magnetic tape) for subsequent control of reproduction.

While the above description is based on the production of a permanent or semipermanent record in three dimensions, if a transparent material, liquid, solid or gaseous, is used which will fluoresce or become opaque transitorily at the line of intersection of projected rays, but not elsewhere, this method may be used to produce three-dimensional motion pictures, by the use of these multiple recordings and reprojections.

Two known devices for adjusting angles of rays entering a medium having different optical properties, where it is not convenient to shape the block of transparent differentially-photosensitive material so that necessary reprojected rays enter normal to its surfaces, are shown in FIGURE 12. In the first method, monochromatic light (not necessarily in the visible range) is shown as projected along rays 46 and 47 into a medium having a refractive index of approximately 1.5 to this wavelength, to intersect at 52, within the space occupied by the material 17, after refraction at the surface to the desired angles of intersection.

In the second method, where monochromatic light need not necessarily be used, the rays enter normally to the outer surfaces of blocks of material 48 and 49 having similar refractive indices as the transparent differentially-photosensitive material 17. If the surface of 17 has the shape of a sphere, and the inner surfaces of 48 and 49 are curved to the exact curvature of the sphere (or of a cylinder where this could be used) they will mate perfectly with the sphere, and no optical deviations of a ray of light passing from 48 or 49 into the sphere will take place. In practice, some slight optical effects such as reflection and interference might take place, which would be rendered negligible if a liquid having the same refractive index as the material 17 was present between the convex surface of the sphere, and the concave inner surfaces, 54, of blocks 48 and 49. The outer surface of blocks 48 and 49 need not be tangential to the sphere, and they may be, as shown in the case of 49, compound blocks, the outer one being, for instance, wedge-shaped to be normal to the desired angle of entrance. Then, as the surfaces opposite the concave surfaces of blocks 48 and 49 are plane surfaces, 48 and 49 can be moved around on the surface of the sphere until these surface planes are normal to any rays of light which are parallel to each other as they enter blocks 48 or 49 from outside, and they will subsequently penetrate on into the sphere with no deviation from their original path. The paths of rays 50 and 51 intersecting at 53, are shown. As in the case of the outer portion of block 49, wedge-shaped pieces may also be used to permit normal incidence of light, penetrating directly through a plane surface of the transparent differentially-photosensitive material 17, with liquid having the same refractive index at the interfaces, if desired.

The following materials were used for test purposes, but the invention is not restricted to these examples:

The first photosensitive material was a gel made up of approximately the following constituents: A solution containing 0.026 gram of sodium carbonate, 0.028 gram of potassium iodide, 0.1 gram of silver nitrate and 1.62 grams of sodium thiosulfate in 25 milliliters of water was added, in the dark, to a solution of 3.76 grams of gelatin in 50 milliliters of warm water, to which gelatin solution had been added, before mixing with the above solution of inorganic salts, 4 milliliters of Promicrol photographic developer solution composed of the following proportions of materials:

| | Grams |
|---|---|
| 2 (B-hydroxyethyl) aminophenolsulfate | 6 |
| p-Hydroxyphenylamino acetic acid | 1.13 |
| Sodium sulphite anhydrous | 100 |
| Sodium carbonate anhydrous | 11.5 |
| Sodium hexametaphosphate | 1.7 |
| Water to make 1 liter. | |

The only quantitatively very critical ingredient in the above composition seemed to be sodium thiosulfate in barely enough amount to prevent precipitation when the salts were mixed. The solution was allowed to set in a transparent plastic container through which the sheets of light were projected to intersect within the space occupied by the gel. Faint traces of discoloration along a sheet of projection tended to resorb on standing in the dark. The gel was only semi-permanent, and lines of intersection were viewed by red light.

The second material was a liquid polyester casting resin, sold commercially under the name of Bio-Plastic, and catalytically transformed to a transparent solid by a peroxide catalyst mixed in before a block was cast. This material turned brown at about 110° C.–120° C. After slight preheating it was exposed to two intense pencils of light intersecting within the space occupied by the material, and lines of intersection guided by a tracing mechanism as described above, were produced within, and surrounded by, the clear plastic.

Having described the invention, what is claimed as new is:

1. A method of three-dimensional photographic reproduction within the space occupied by a transparent differentially-photosensitive material which comprises projecting a plurality of light rays on to the three-dimensional shape to be reproduced, each ray covering a small area of the object, said light rays being generally distinct from each other where they impinge on the object as primary lines, and being of sufficient number that substantially the entire surface to be reproduced is outlined by the plurality of separate rays; recording images of the primary lines projected on the object, at more than one different angle, as secondary lines; projecting simultaneously the secondary lines produced by viewing a primary line at more than one different angle, one set only of secondary lines produced by recording a primary line, at any one instant, with the sheets of energy projected having the cross-sectional shape of said secondary lines passing into the transparent differentially-photosensitive material, which must have adequate space in three dimensions to contain the resulting three-dimensional reproduction and not be merely a thin film, to intersect at the same angles as the originally projected primary line was recorded, the additive energy from the projected secondary lines producing an effect which induces visibility within the space occupied by the transparent differentially-photosensitive material that is not produced by any one of the intersecting rays, within the time of said simultaneous projection; the above-mentioned secondary projections of views of a primary line are then extinguished, and another set of secondary lines, produced by viewing a primary line which was projected on a different area of the object than the preceding one, and its images recorded at more than one different angle, are projected along sheets of energy, said sheets of energy intersecting within the transparent differentially-photosensitive material at the same angles as originally recorded, and with a similar position relative to the preceding activated line as the two primary lines were positioned on the original object; the process is then continued, with primary lines covering surfaces of the object generally distinct from each other, each primary line being recorded at more than one different angle, and the resulting secondary lines being projected along sheets of energy to produce one line of intersection at a time within the space occupied by the transparent differentially-photosensitive material in similar relative shape and positions as the primary lines appeared on the original object, this multiplicity of lines where intersection occurs thus building up a three-dimensional surface of photographically altered material within the space occupied by the transparent differentially-photosensitive material, which outlines an image similar in shape to that of the original three-dimensional object.

2. A method according to claim 1 in which the transparent differentially-photosensitive material was a gel made up of approximately the following constituents: a solution containing 0.026 gram of sodium carbonate, 0.028 gram of potassium iodide, 0.1 gram of silver nitrate, and just sufficient sodium thiosulfate to retain these salts in solution (from 1.0 to 2.0 grams), in 25 milliliters of water was added, in the dark, to a solution of 3.76 grams of gelatin in 50 milliliters of warm water, to which gelatin solution had been added, before mixing with the above solution of inorganic salts, 4 milliliters of Promicrol photographic developer solution composed of the following proportions of materials:

| | Grams |
|---|---|
| 2 (B-hydroxyethyl)aminophenolsulate | 6 |
| p-Hydroxyphenylamino acetic acid | 1.13 |
| Sodium sulphite anhydrous | 100 |
| Sodium carbonate anhydrous | 11.5 |
| Sodium hexametaphosphate | 1.7 |
| Water to make 1 liter. | |

3. A method according to claim 1, in which the secondary lines are traced, with tracers attached to devices emitting pencils of energy external of the areas of the recordings of the secondary lines, thus causing the intersecting pencils of energy to simultaneously sweep out the shapes of the sheets of energy of claim 1, thereby producing the same effect within the space occupied by the transparent differentially-photosensitive material.

4. A method according to claim 3, where the transparent differentially-photosensitive material is a cast polyester plastic solidified with a peroxide catalyst.

References Cited

UNITED STATES PATENTS

| | | | |
|---|---|---|---|
| 2,350,796 | 6/1944 | Morioka | 156—58 |
| 2,374,981 | 5/1945 | Cooke | 156—58 |
| 2,949,361 | 8/1960 | Agens | 96—115 |

OTHER REFERENCES

Stookey, S. D.: Chemical Machinery of Photosensitive Glass, Ind. and Eng. Chem. 45, No. 1, January 1953, pp. 115–118.

NORMAN G. TORCHIN, *Primary Examiner.*

J. R. EVERETT, *Assistant Examiner.*